United States Patent
Liebeno et al.

(10) Patent No.: US 9,456,655 B2
(45) Date of Patent: Oct. 4, 2016

(54) SYSTEMS AND METHODS FOR STABILIZATION OF A PHYLON ARTICLE

(75) Inventors: Bret Liebeno, West Linn, OR (US); Jeff Rask, Beaverton, OR (US); Anthony Dean, Newberg, OR (US)

(73) Assignee: NIKE, Inc., Beaverton, OR (US)

( * ) Notice: Subject to any disclaimer, the term of this patent is extended or adjusted under 35 U.S.C. 154(b) by 741 days.

(21) Appl. No.: 13/122,692

(22) PCT Filed: Sep. 28, 2009

(86) PCT No.: PCT/US2009/058616
§ 371 (c)(1),
(2), (4) Date: Jun. 21, 2011

(87) PCT Pub. No.: WO2010/037026
PCT Pub. Date: Apr. 1, 2010

(65) Prior Publication Data
US 2012/0136083 A1  May 31, 2012

Related U.S. Application Data

(60) Provisional application No. 61/194,471, filed on Sep. 26, 2008.

(51) Int. Cl.
*B29B 17/00* (2006.01)
*A43B 13/04* (2006.01)
(Continued)

(52) U.S. Cl.
CPC .......... *A43B 13/04* (2013.01); *A43B 13/125* (2013.01); *A43B 13/42* (2013.01); *B29C 44/3415* (2013.01); *B29C 44/56* (2013.01); *B29D 35/0054* (2013.01); *B29D 35/122* (2013.01)

(58) Field of Classification Search
CPC .................................................. B29C 44/3419
USPC .............................. 264/340, 342 R, 345, 442
See application file for complete search history.

(56) References Cited

U.S. PATENT DOCUMENTS 2,920,988 A * 1/1960 Bulat ............................ 148/558
3,447,788 A * 6/1969 Bornor ............................. 432/2
(Continued)

FOREIGN PATENT DOCUMENTS

CN  1533724     10/2004
EP  1491574 A1  12/2004
(Continued)

OTHER PUBLICATIONS

Chinese First Office Action of Feb. 4, 2013 for CN 200980144915.7.
(Continued)

*Primary Examiner* — Stella Yi
(74) *Attorney, Agent, or Firm* — Shook, Hardy & Bacon L.L.P.

(57) ABSTRACT

A manufacturing method, within a modularized manufacturing environment for stabilizing a phylon article that is produced utilizing a heat press, is provided. Initially, the method includes immersing a phylon article in a first tank, with a fluid disposed therein, and withdrawing the phylon article from exposure with the fluid. Typically, the midsole is heated from its production with the heat press when it is placed into the first tank. The immersion in the first tank acts to cool the phylon article, thereby stabilizing the heated phylon. The phylon article may be next placed in a second tank, with a fluid disposed therein, and withdrawn from exposure with the fluid. The fluid of the first tank may reside at a temperature comparable to or higher than the temperature of the fluid of the second tank. Recursively exposing the heated phylon article to the fluid of the tanks incrementally decreases the volume of the article.

20 Claims, 6 Drawing Sheets

(51) Int. Cl.
*A43B 13/12* (2006.01)
*A43B 13/42* (2006.01)
*B29D 35/12* (2010.01)
*B29D 35/00* (2010.01)
*B29C 44/34* (2006.01)
*B29C 44/56* (2006.01)

(56) References Cited

U.S. PATENT DOCUMENTS

| | | | |
|---|---|---|---|
| 3,562,026 A * | 2/1971 | Massey | 148/713 |
| 3,708,263 A * | 1/1973 | Boucher | 422/20 |
| 3,858,329 A * | 1/1975 | Koide et al. | 34/265 |
| 4,066,430 A * | 1/1978 | Franz | 65/116 |
| 4,144,297 A * | 3/1979 | Tomar | 264/45.5 |
| 4,200,708 A * | 4/1980 | McClain | 525/62 |
| 4,859,540 A * | 8/1989 | Bragole | 428/522 |
| 5,141,578 A * | 8/1992 | Yang | 156/79 |
| 5,308,420 A * | 5/1994 | Yang | 156/79 |
| 5,318,645 A * | 6/1994 | Yang | 156/79 |
| 5,736,075 A * | 4/1998 | Lee et al. | 264/28 |
| 5,972,257 A * | 10/1999 | Liu | 264/40.4 |
| 6,129,798 A * | 10/2000 | Yang | 156/79 |
| 6,176,067 B1 * | 1/2001 | Bahten | 53/428 |
| 6,241,920 B1 * | 6/2001 | Cotter et al. | 264/1.24 |
| 6,273,977 B1 * | 8/2001 | Harden et al. | 156/51 |
| 6,287,698 B1 * | 9/2001 | Zhu et al. | 428/424.4 |
| 6,312,630 B1 * | 11/2001 | Hartman | 264/45.9 |
| 6,497,786 B1 * | 12/2002 | Kilgore et al. | 156/379.8 |
| 6,777,460 B2 * | 8/2004 | Palazzotto et al. | 522/25 |
| 7,100,309 B2 | 9/2006 | Smith et al. | |

FOREIGN PATENT DOCUMENTS

| | | |
|---|---|---|
| JP | H0910014 A | 1/1997 |
| JP | 2000270901 A | 10/2000 |
| JP | 2001269929 A | 10/2001 |
| JP | 2004345160 A | 12/2004 |
| JP | 2005029717 A | 2/2005 |
| JP | 2005261750 A | 9/2005 |
| JP | 2008110176 A | 5/2008 |
| KR | 20030083645 A | 10/2003 |
| WO | 2007139832 A2 | 12/2007 |

OTHER PUBLICATIONS

International Search Report and Written Opinion of Dec. 14, 2009 for Application No. PCT/US/09/58616.
European Search Report dated Mar. 31, 2016 for European Patent Application No. 098169915, 8 Pages.

* cited by examiner ial modules. Hence, embodiments of the present invention contemplate a vast array of modules that may span various types of environments (e.g., manufacturing and retail environments) and that may link geographically distributed locations.

SYSTEMS AND METHODS FOR STABILIZATION OF A PHYLON ARTICLE

CROSS-REFERENCE TO RELATED APPLICATIONS

This application claims the benefit of U.S. Provisional Application No. 61/194,471, filed Sep. 26, 2008, entitled SYSTEMS AND METHODS FOR STABILIZATION OF A PHYLON ARTICLE, herein incorporated by reference.

TECHNICAL FIELD

The present invention relates generally to a system and method for stabilizing an article of phylon. In particular, aspects of the invention include stabilizing a phylon midsole that has been expanded upon activation by a foaming agent incorporated therein.

BACKGROUND OF THE INVENTION

One skilled in the art of footwear manufacturing and design will realize that a midsole component of a shoe may primarily serve as a focus of the shoe's cushioning system. Generally, midsoles are manufactured from foam and provide a consistent firmness throughout. Midsoles constructed of phylon must be "stabilized" to its final size prior to being incorporated into the rest of a shoe. Phylon stabilization involves cooling the phylon, often in an oven in which the temperature is gradually reduced.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Generally, embodiments of the invention relate to modularized manufacturing by implementing a manufacturing method for stabilizing a phylon article that is produced utilizing a heat press. Initially, the method includes immersing a phylon article in a first tank, with a fluid disposed therein, and withdrawing the phylon article from exposure with the fluid. Typically, the phylon article is cooled from its production with the heat press when it is placed into the first tank. The immersion in the first tank acts to cool the phylon article via conduction, thereby stabilizing the heated phylon article. In some embodiments, the phylon article may be next placed in a second tank, with a fluid disposed therein, and withdrawn from exposure with the fluid. In an exemplary embodiment, the fluid of the first tank resides at a range of temperatures that are higher than a range of temperatures at which the fluid of the second tank resides. In other embodiments, the fluid of the first tank resides at range of temperatures that are substantially equivalent to a range of temperatures at which the fluid of the second tank resides. As a result of recursively exposing the heated phylon article to the fluid of the first tank and the fluid of the second tank, the phylon article exhibits an incremental decrease in volume, and possibly deformation, after being bathed in each tank. In other embodiments, the method may include placing the phylon article in a third tank and a fourth tank each with a fluid disposed therein. Typically, the fluid of the second tank resides at a range of temperatures that are comparable to or higher than a range of temperatures at which the fluid of the third tank resides, and the fluid of the third tank resides at range of temperatures that are comparable to or higher than a range of temperatures at which the fluid of the fourth tank resides.

BRIEF DESCRIPTION OF THE DRAWING

The present invention is described in detail below with reference to the attached drawing figures, wherein.

DETAILED DESCRIPTION OF THE INVENTION

Figure 1:
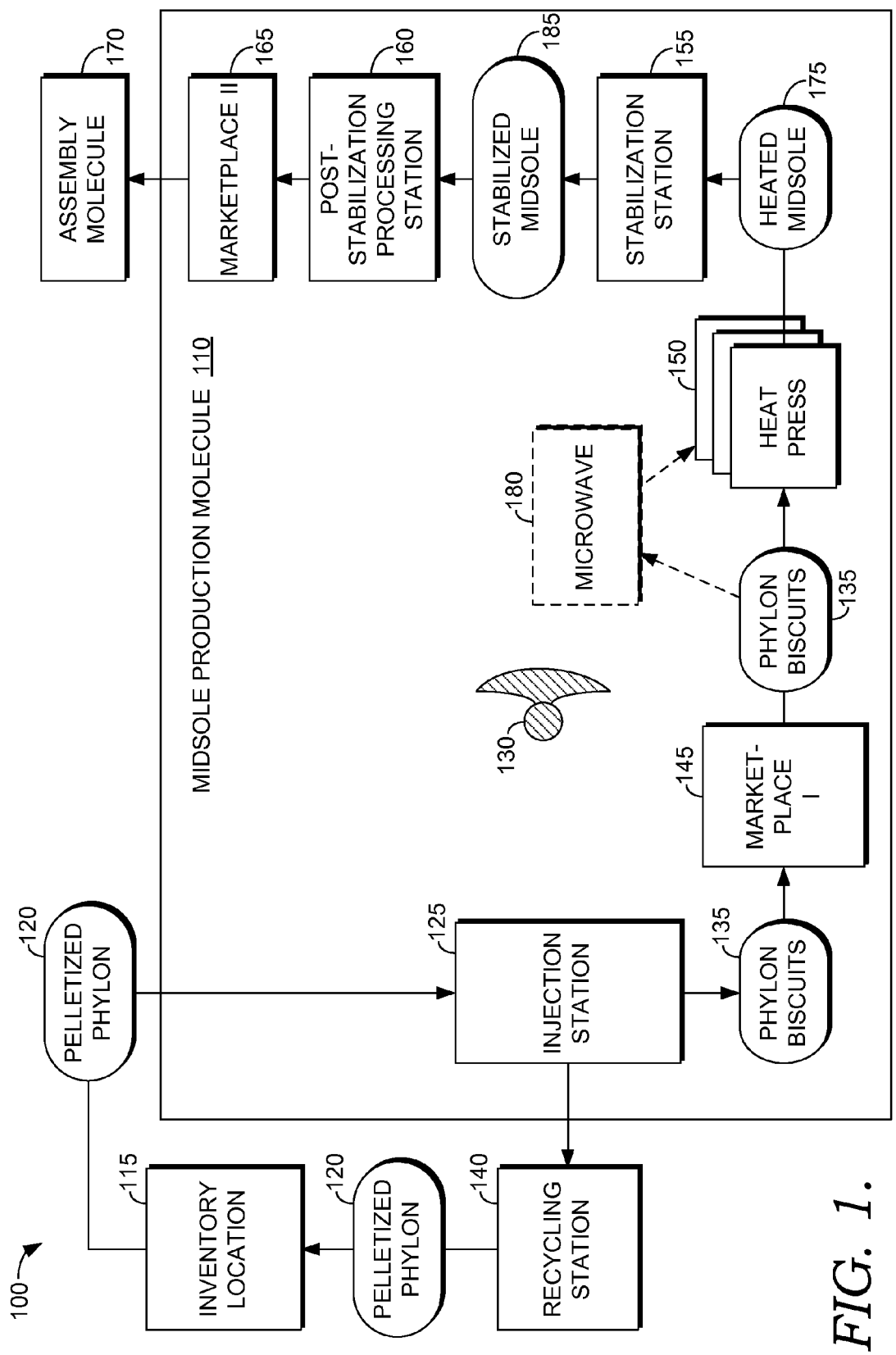
FIG. 1 is a block diagram of an exemplary modularized manufacturing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the invention may be described in the general context of a modularized manufacturing environment for generating an article of footwear from basic, unprocessed materials. In particular, the modularized manufacturing environment is responsive to direct sales orders and enables the production of personalized footwear that meet the specifications of the orders. This environment may be flexible allowing for various customizations and/or models of a type of footwear (e.g., track-style versus cross-country-style running shoes), and is adaptable to produce various types of footwear (e.g., running shoes versus basketball shoes).

In one configuration, the modularized manufacturing environment is adapted to execute a manufacturing process of single flow customization. This single flow manufacturing process employs a production model that includes micro-manufacturing building blocks referred to herein as modules. The concept of "modules" should not be construed as limiting and may encompass any portion of a manufacturing process or device that facilitates a piece of a manufacturing processes. It should be understood and appreciated that the designation of "modules" is not meant to be limiting, and should be interpreted broadly to include one or a plurality of manufacturing tasks (e.g., fabrication and assembly) that may be performed by independent-functioning processing areas, as well as the devices and personnel that implement the manufacturing tasks designated to a particular module.

These separate modules may be interconnected via a process flow. In one instance, several stages of the manufacturing process are performed within a module on a partially-complete footwear article. Upon performing the last of these stages, the partially-completed footwear article is passed to another module as indicated by the production model created for that subject footwear article. In another instance, the last stage of a manufacturing process implemented at one module may encompass placing a partially-complete footwear article in a marketplace that feeds into another module. This marketplace may include a temporary storage area that holds a plurality of partially-complete footwear articles (e.g., various styles, types, and sizes of shoes) such that they are easily accessible by an operator of the other module. Upon removing a partially-complete footwear article from the marketplace, this exemplary temporary storage area may indicate to an operator at the initial module to perform a manufacturing process that fills the particular void of the temporary storage area. That is, the marketplace may function as a signaling system to trigger actions (e.g., production or supply of a unit) at the modules that feed thereto.

Accordingly, the marketplace is an effective tool to accomplish the following goals of the modularized manufacturing environment: maintaining optimized, but lean, inventory levels; providing a signal to replenish (i.e., produce and deliver) a new partially-complete footwear article as a similar article is consumed. Further, the interaction between the modules reflects a pull system that determines the supply, or production, according to the actual demand of the direct sales orders. Further yet, the manufacturing processes implemented at the various modules may be performed concurrently, thereby continuously filling and drawing from the marketplaces In embodiments, these modules may be quickly updated to perform various manufacturing processes according to the production model of a particular footwear article. By updating the modules individually and concurrently, greater flexibility may be achieved by the modularized manufacturing environment, as opposed to a conventional manufacturing system. In addition, modules may be added or reduced based on the production model of a particular footwear article. For instance, for a complex footwear article, one or more modules may be incorporated into the modularized manufacturing environment, typically linked to one or more of the established marketplaces. Accordingly, the modularized manufacturing environment is scalable based, in part, on the type of footwear article to be produced, and/or the rate of production desired.

In a particular exemplary utilization of modules in a manufacturing process, a running-shoe construction process may divided in to various modules that are assigned individual or shared operations related to fabrication and assembly of the running shoe, in accordance with the production model of the running shoe. By way of example, one module may be individually responsible for cutting and printing a design on a section of synthetic leather, while sharing the responsibility of assembling an upper portion of the running shoe with another module. In another example, one module may be responsible for manufacturing portion(s) of the running shoe from raw grey goods, such as pelletized rubber for outsoles or phylon for midsoles.

Although various embodiments for practicing the invention with the modularized manufacturing environment, which comprises interlinked modules, have been described, it should be understood and appreciated by those of ordinary skill in the art that other types of suitable production designs for implementing manufacturing processes may be used, and that the embodiments of the invention are not limited to those configurations described herein. Further, the present invention considers utilizing any number of modules to produce a footwear article, or any other good, and should not be construed as limited to the production of shoes.

One particular module, of the modularized manufacturing environment, may be allocated for implement a manufacturing process that generates an midsole. Generally, a sole comprises the bottom of a shoe. The sole is made up of an midsole and an outsole. The outsole is the layer in direct contact with the ground and may comprise a single piece, or may comprise separate pieces, of material (e.g., dress shoes have leather outsoles while casual or sports-oriented shoes have outsoles made of natural rubber or a synthetic imitations thereof). In contrast, the midsole comprises an interior bottom of a shoe, which sits directly beneath the foot of a user. Many shoes have removable and replaceable midsoles. Further, midsoles are often added for comfort or health reasons, such as to control the shape of the foot or to eliminate moisture.

The systems and methods of the present invention produce a phylon article (e.g., midsole) utilizing a heat press and to stabilize the article upon removal from the heat press. However, people familiar with the field of the invention will realize that manufacturing process related to producing the midsole may be practiced, and divided, by various stages/steps which are different from the specific illustrated procedures. Therefore it is emphasized that the invention is not limited only to the two discrete procedures but is embraces a wide variety of discrete and combined procedures that comprises the midsole manufacturing process.

Initially, embodiments of the procedure for generating the midsole in a heat press from "biscuits," and the midsole achieved thereby, will now be described with reference to the accompanying drawings. The drawings and the associated descriptions are provided to illustrate embodiments of the present invention and not to limit the scope thereof. Reference in the specification to an "embodiment" is intended to indicate that a particular feature, structure, or characteristic described in connection with the embodiment is included in at least an embodiment of the invention. Further, the appearance of the phrase "in one embodiment" in various places in the specification are not necessarily all referring to the same embodiment.

Referring to the drawings in general, and initially to FIG. 1 in particular, a modularized manufacturing environment 100 adapted to execute a manufacturing process of single flow customization is shown, in accordance with an embodiment of the present invention. As discussed above, the modularized manufacturing environment 100 may include any number of modules and marketplaces that interlink the modules. Because the focus of this discussion pertains to the procedure for expanding the phylon biscuits into a midsole, a midsole production module 110 is featured. The midsole production module 110 includes an injection station 125, marketplace I 145, one or more heat presses 150, a stabilization station 155, a post-stabilization processing station 160, and a marketplace II 165.

Generally, the injection station 125 is configured to generate phylon biscuits 135 from pelletized phylon 120. The pelletized phylon 120 (e.g., ethylene-vinyl acetate (EVA) foam pellets) may be stored in an inventory location 115, such as a storage bay. The inventory location 115 may be located within the boundaries of the midsole production module 110, removed from the midsole production module 110 but within the same facility, or at a remote facility. The inventory location 115 may be organized in such a way that the earliest pelletized phylon 120 stocked to the inventory location 115 may be used before later-stocked pelletized phylon 120 (i.e., utilizing a first-in-first-out (FIFO) scheme). Retrieval of the pelletized phylon 120 from the inventory location 120 may be based according to a particular time schedule, such as shelf-life of the pelletized phylon 120 or direct sales orders to be satisfied.

Upon conveyance from the inventory location 115 to the injection station 125, the pelletized phylon 120 is heated until molten, but not reaching the point where the foaming agent is activated. In one particular example, a threshold temperature is established (e.g., 100 degrees Celsius) to which the molten phylon is heated. This threshold temperature is typically set below a temperature at which a foaming agent, incorporated within the pelletized phylon 120, is activated. The molten phylon may be injected into one or more pre-forms, or molding cavities, via runners through an injection mold. This injection process is complete upon cooling the molten phylon within the pre-forms such that a plurality of phylon biscuits 135 are generated. The phylon biscuits 135 assume the general shape of the pre-forms and remain substantially hard and inflexible. Accordingly, the pre-forms precisely control the volume of molten phylon injected therein, and the size and shape of the generated phylon biscuits 135. Further, based on the configuration of the cavity of the pre-forms within the infection mold, the phylon biscuits may be generated in a variety of shapes. By way of example only, the phylon biscuits 135 may be formed into a general shape of a marshmallow or may be formed into the complex shape of interlocking pieces.

The finished phylon biscuits 135 are moved from the injection station 125 to the marketplace I 145 for temporary storage. The excess phylon that is captured and cooled in the runners of the injection mold, as well as any other overflow phylon, may be passed to a recycling station 140. Generally, the recycling station 140 is responsible for grinding this excess phylon into pelletized phylon 120 that may be stored in the inventory location 115 and reused at a later time. This process of reusing the excess phylon is made possible because the molten phylon is not heated above the threshold temperature, where the foaming agent is activated. Thus, the molten phylon is not expanded, or "blown," thereby maintaining the chemical properties of the phylon in tact and allowing it to be reused. In this way, the recycling station 120, in tandem with the injection process of the injection station 125, reduces wasting phylon and the expenses associated therewith.

A selection of the phylon biscuits 135 may be extracted from the marketplace I 145 to be utilized for as the starting materials for forming the phylon article. In other embodiments, the pelletized phylon 120 may be moved from the inventory location 115 and held in the marketplace I 145. This pelletized phylon 120 may then be extracted to be utilized for as the starting materials for forming the phylon article, either individually or in tandem with the selection of the phylon biscuits 135. In an exemplary embodiment, the phylon biscuits 135 and/or the pelletized phylon 120 are advanced to a pre-heat process prior to placement into, and expansion within, the heat presses 150. In general, the pre-heat process serves to introduce heat internally to the phylon biscuits 135 and/or the pelletized phylon 120 such that a consistent expansion is achieved upon heating the preheated phylon biscuits with the heat presses 150. In other words, the pre-heat process generates heat at the inside of the phylon biscuits 135 and/or the pelletized phylon 120, while the heat presses 150 initially heat the surface of the phylon biscuits; thus, uniformly melting the phylon biscuits 135 and/or the pelletized phylon 120 via consistent activation of the foaming agent. Further, pre-heating one or more of the phylon biscuits 135 and/or the pelletized phylon 120 may offer the advantage of significantly reducing the time it takes to properly expand the phylon biscuits 135 and/or the pelletized phylon 120 with the heat presses 180.

In one instance, a microwave 180 is provided to introduce the heat internally to the phylon biscuits 135 and/or the pelletized phylon 120. The microwave 180, as is understood by those of ordinary skill in the relevant field, may be any device that can internally heat an object before or concurrently with heating its outside, such as, but not limited to a food-service microwave (e.g., Magic Chef model # MCB780W that operates at 1.2 kilowatts), an industrial/commercial microwave, an apparatus that is capable of introducing microwaves, or any other form of radiation, into an object, or an oven that heats the inside and outside of an object evenly.

In certain preferred embodiments hereof, the phylon biscuits 135 and/or the pelletized phylon 120 are heated in the microwave 180 until a threshold temperature at a core location is reached. In another embodiment, the pre-heat process includes introducing heat internally to the phylon biscuit 135 and/or the pelletized phylon 120 based on a time scale. By way of example only, the phylon biscuits 135 and/or the pelletized phylon 120—either individually or in any combination—may be pre-heated for 65 seconds on a high setting of the Magic Chef style of the microwave 180. However, it should be understood that any method for gauging the amount of heat introduced to the phylon biscuits and/or the pelletized phylon 120 during the pre-heat process may be used, and is contemplated by the present invention.

Upon, completion of the pre-heat process, the pre-heated phylon biscuits and/or the pelletized phylon 120 are passed from the microwave 180 to one or more of the heat presses 150 for placement therein. The heat presses 150 are generally configured to integrate a plurality of the phylon biscuits 135 to form the midsole upon activation. In an exemplary embodiment, integrating includes, at least, raising the selected phylon biscuits 135 and/or the pelletized phylon 120 above a threshold temperature. This threshold temperature of the heat press 150 is greater than the threshold temperature of the injection station 125. In one instance, the threshold temperature of the heat press 150 is established at a temperature high enough to activate the foaming agent incorporated within the pylon biscuits 135 and/or the pelletized phylon 120. By way of example only, the phylon biscuits 135 and/or the pelletized phylon 120 are heated to a threshold temperature set at 160-172 degrees Celsius for a duration of 8-13 minutes. This heat initiates the blowing process that causes the phylon biscuits 135 and/or the pelletized phylon 120 to expand to generally twice the size that they were received. In another instance, a target expansion rate may be 160%. In exemplary embodiments, the phylon biscuits 135 and/or the pelletized phylon 120 are blown at similar expansion rates regardless of their individual density or level of firmness.

As discussed above, the foaming agent incorporated into the phylon biscuits 135 and/or the pelletized phylon 120 is responsible for invoking the expansion thereof. The foaming agent is incorporated into the phylon as an ingredient when received in pellet form. Although conventionally referred to in several different manners, such as blowing agent, the ingredient incorporated into the phylon that assists, or is responsible for, causing expansion upon heat activation is referred to herein as the foaming agent.

The foaming agent may be any substance which alone or in combination with other substances is capable of producing a cellular structure in a plastic. Foaming agents may include compressed gases that expand when pressure is released, soluble solids that leave pores when leached out, liquids that develop cells when they change to gases, and chemical agents that decompose or react under the influence of heat to form a gas. By way of example, chemical foaming agents range from simple salts, such as ammonium or sodium bicarbonate, to complex nitrogen releasing agents. In operation, once the heat press 150 arrives at the activation temperature of the foaming agent, a polymer chain of the phylon biscuits begins to break down causing the phylon to attain elastomeric properties such as softness and flexibility. Accordingly, the phylon, once cooled assumes shock absorption characteristics.

In addition, the process of integrating includes, at least, causing the heated phylon biscuits 135 to expand such that each of the phylon biscuits 135 couples with another of the phylon biscuits 135. Or, in other embodiments, the process of integrating includes causing the heated phylon biscuits 135 and the pelletized phylon 120 to expand such that each of the phylon biscuits 135 couples with individual particles of the pelletized phylon 120. In still other embodiments, the process of integrating includes causing the heated pelletized phylon 120 to expand such that each of the individual particles of the pelletized phylon 120 couples with each other. Accordingly, the heat press 150 melds the phylon biscuits 135 and/or the pelletized phylon 120 together to form a flexible heated midsole 175. However, persons familiar with the field of the invention will realize that the heat press 150 may be implemented to generate other flexible phylon articles which are different from the specific illustrated embodiment. Therefore, it is emphasized that the invention is not limited only to midsoles, but is embracing of a wide variety of components which fall within the spirit of the following claims.

In an exemplary embodiment, melding the phylon biscuits 135 and/or the pelletized phylon 120 together to form the heated midsole 175, includes melting the phylon biscuits 135 and/or the pelletized phylon 120 to a viscous material (e.g., a tacky liquid), and maintaining the temperature of the viscous phylon biscuits 135 and/or the pelletized phylon 120 such that they fuse together and cross link to form boundaries. That is, the viscous phylon biscuits 135 and/or the pelletized phylon 120 are heated such that they flow to the extend where each interferes with another or a wall of a mold cavity of the heat press 150. Accordingly, although the phylon biscuits 135 and/or the pelletized phylon 120 are expanded and interlink to form the heated midsole 175, there remains a defined separation of the phylon biscuits 135 or the compartmentalization of the pelletized phylon 120.

Figure 2:
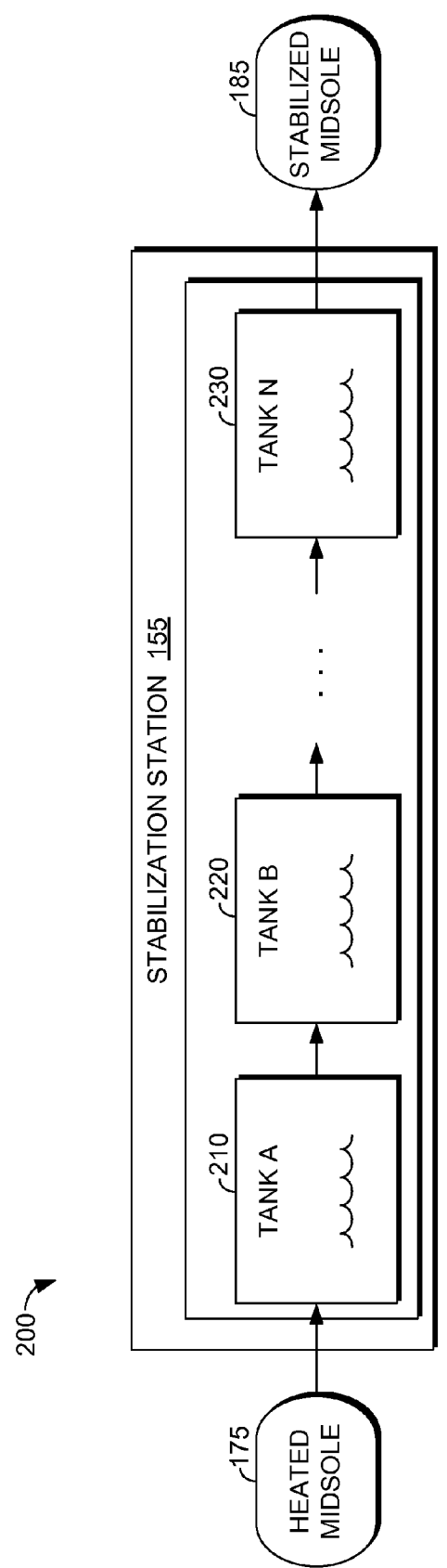
FIG. 2 is a block diagram illustrating a stabilization process implemented at a stabilization station within the midsole production molecule, in accordance with embodiments of the present invention.

The heated midsole 175 is then passed to the stabilization station 155 for stabilizing. The process of stabilizing the midsole, when heated from the heat press, will now be discussed with reference to FIGS. 1 and 2. In particular, FIG. 2 is a block diagram illustrating a stabilization process 900 implemented at the stabilization station 155 within the midsole production modules 110, in accordance with embodiments of the present invention. It should be appreciated that phylon articles, including midsoles, may be produced using methods and techniques other than the biscuit technique described above for exemplary purposes. Stabilization station 155 may be used in accordance with the present invention to stabilize phylon articles of other types and/or made using other process.

Initially, the heated midsoles 175 are removed from the molding cavity of the heat press 150, and passed to the stabilization station 155. The stabilization station 155 may comprise a plurality of tanks, such as tank A 210, tank B 220, and tank N 230, that each hold a fluid at a particular temperature. In other embodiments of the stabilization station 155, using a single tank, such as only tank A 210, is considered. The tanks 210, 220, and 230 are referred to hereinafter as baths. The number of baths may vary and may comprise one or more tank. In an exemplary embodiment, three or four baths are used; however, the exact number of baths is determined by, in part, the geometry or composition of the heated midsoles 175. In addition, each of the baths is held a particular temperature. In one instance, a progression of baths is established such the heated midsole 170 is iteratively placed into the baths that each are held at comparable temperatures to one another. In another instance, a progression of baths is established such the heated midsole 170 is initially placed into the bath with the hottest particular temperature (e.g., tank A 210) and finally placed in the bath with the coolest particular temperature (e.g., tank N 230) to render the stabilized midsole 185 in a tiered cooling method. The method utilized for placing the midsole into each of the baths, and withdrawing them therefrom, may be manual (e.g., by gloved hand) or automatic (e.g., by a conveyor mechanism). By way of example only, the stabilization station 155 may include a progression of four baths held at approximately 75, 65, 55, and 45 degrees Celsius. The heated midsole 175 may be stabilized by being submerged by a conveyor into the first bath of 75 degrees, and then into the next incrementally hottest bath until the stabilized midsole 185 is withdraw from the bath held at approximately 54 degrees Celsius.

In operation, placing the midsole in incrementally cooler baths gradually, and controllably, ramps down the temperature of the midsole, thereby reducing the size of the midsole to meet the dimensional criteria of a type and size of footwear. Generally, a water-based fluid may be used in each of the baths. Advantageously, water serves as an efficient conductor of heat, as opposed to the conventional air stabilization systems. That is, water provides many times the conductivity of air; thus, water is capable of drawing heat from the heated midsole 175 at a much faster rate than air. By way of example, a phylon article that took forty-five minutes to stabilize using an air-convection cooling process would take about eight minutes to stabilize in a water-conduction cooling process. Accordingly, the stabilization using water baths is a rapid process for transferring heat away from the heated midsole 175 that results in more consistent parts and less material waste (i.e., eco-friendly).

Further, additional types of fluids may be used in the stabilization station 155 besides simply water. In one embodiment, a water-based fluid may include a cleaning solution that performs a cleaning operation on the heated midsole 175 (i.e., removing dust and allergens), particularly when an ultrasonic washer device (not shown) is incorporated into the stabilization station 155. By way of example, the cleaning solution may be soap or cleaning agent. In another embodiment, a water-based fluid in one or more of the tanks 210, 220, and 230 may include additives that are capable of priming the heated midsole 175 for subsequent application of an adhesive. By way of example, the additive may include a UV-activated chloride salt that penetrates or attaches to the surface of the heated midsole 175 when the heated midsole 175 is immersed in one or more of the tanks 210, 220, and 230 with the priming additives added thereto. Because the progression of baths in the stabilization station 155 inherently cleans the heated midsole 175, and may provide other benefits as discussed above, a bagging procedure may be performed to the stabilized midsole 185 upon its exit from the stabilization station 155. The bagging procedure, in one instance, involves placing the stabilized midsole 185 in a container (e.g., plastic bag) and sealing the container to preserve the cleanliness of and/or the primer attached to the stabilized midsole 185.

Although two different type of additives (cleaning solution and primer additives) have been described, it should be understood and appreciated by those of ordinary skill in the art that other types of suitable additives that provide other benefits may be used, and that embodiments of the present invention are not limited to additives described herein. By way of example, a solvent to enhance the conductive properties of the fluids in the baths may be used.

In an exemplary embodiment, there exists three or four baths in the stabilization station 155. In the three-bath configuration, the temperatures of the baths may range from 90 degrees Celsius to 45 degrees Celsius. By way of example, the temperature of the first bath may be held at, or around, 90 degrees Celsius, the temperature of the second bath may be held at, or around, 75 degrees Celsius, while the temperature of the third bath may be held at, or around, 45 degrees Celsius. In the four-bath configuration, the temperatures of the baths may range from 90 degrees Celsius to 45 degrees Celsius, or even broader, as more baths allow for gradual stabilization over a greater temperature range. By way of example, the temperature of the first bath may be held at, or around, 90 degrees Celsius, the temperature of the second bath may be held at, or around, 75 degrees Celsius, the temperature of the third bath may be held at, or around, 60 degrees Celsius, while the temperature of the fourth bath may be held at, or around, 45 degrees Celsius. Although two different bath configurations of the stabilization station 155 have been described, it should be understood and appreciated by those of ordinary skill in the art that other types of suitable configurations of the baths (e.g., sizes, volume of fluid, and number) and temperatures thereof that facilitate stabilization may be used, and that embodiments of the present invention are not limited to those configurations described herein. For example, the one or more of the baths may have a substantially similar temperature, or may have a varied temperature within a single bath, based on a location of a heat-exchange element. Heating and/or cooling elements of any type may be used without departing from the scope of the present invention.

Although water-based formulations of the fluid in the baths of the stabilization station 155 have been described, it should be understood and appreciated by those of ordinary skill in the art that other types of suitable fluids that provide cooling and stabilization of the heated midsole may be used, and that embodiments of the present invention are not limited to water-based fluids described herein. For instance, an oil-based or alcohol-based fluid may be used. In yet another instance, one or more baths may contain one type of fluid, while other may contain another type of fluid, or various types of fluid. As such, the type of fluid used to in the baths of stabilization station 155 should not be construed as limiting.

In other embodiments, upon stabilizing the midsoles 160 in the baths, the stabilization station may include one or more fans, blowers (e.g., air knife centrifugal blower), and the like, for drying and further cooling/stabilization of the midsoles 160. In one instance, a plurality of blowers is used to further stabilize the midsoles 160 and each blower may be configured to blow air at a particular temperature. By way of example, the temperatures of the air propelled by the blowers may be set incrementally cooler from a first blower to encounter the midsole 160 to the last, over a temperature range. The temperature of the air may be adjustable and may be established by a heat exchanger, a restriction in the air flow, or any other means of generating heat within transient air.

Figure 3:
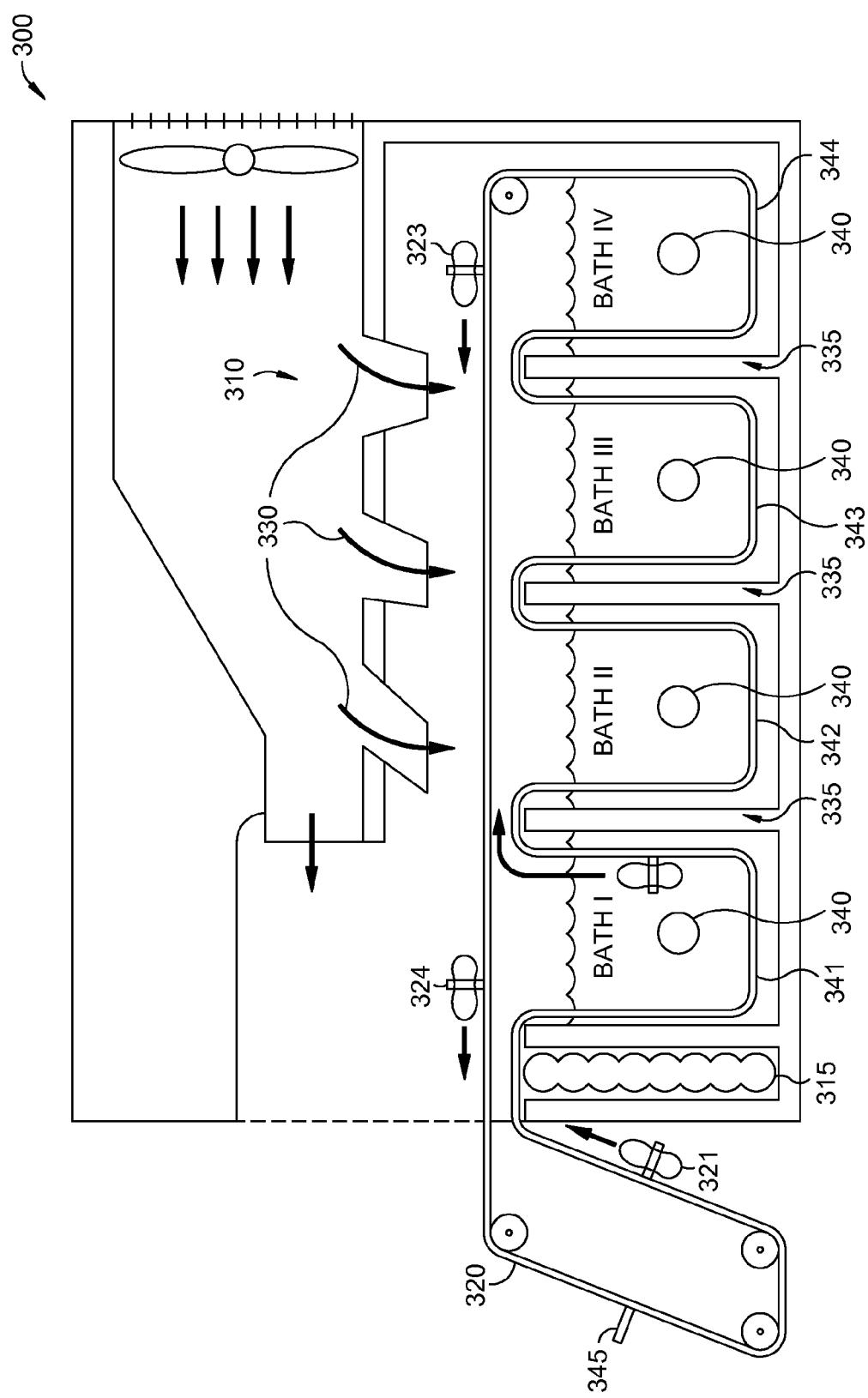
FIG. 3 illustrates a diagrammatic view of an exemplary apparatus for stabilizing a phylon article, in accordance with embodiments of the present invention.

With reference to FIG. 3, a diagrammatic view that illustrates an exemplary apparatus 300 within the stabilization station 155 is shown. Initially, the apparatus 300 includes baths 341, 342, 343, and 344, each with a heat exchanger 340 disposed therewith. The heat exchangers 340 may be set at varying temperatures and may comprise any type of heat exchanger known in the relevant field. In other embodiments, the heat-exchanger 340 may be replaced with one or more of a heating element or a cooling device. In addition, a blower system 310 is provided that propels heated air 330 to midsoles 323 and 324, upon leaving the bath IV 344. Further, a conveyor 320 is provided to automatically immerse the midsoles 321 and 322 in each of the baths 341, 342, 343, and 344, and carry the midsoles 323 and 324 under the heated air 330. Carrying the midsoles 321, 322, 323, and 324 is facilitated by the holders 345 (e.g., trays, boxes, clips, etc.) distributed along the conveyor 320.

In operation of the present system, the midsole 321 is loaded on the conveyor on one of the holders 345 and is carried to, and immersed within, the fluid of bath I 341. The fluid may be heated by the heat exchanger 340, which is located in proximity with the bath I 341, attached to the bath I 341, or submerged therein. Next, the midsole 322 is removed from the bath I 341 an placed in the bath II 342 that may be held at a separate temperature. Insulation 315 may be provided between the baths 341, 342, 343, and 344 to facilitate maintaining each bath a consistent pre-established temperature, or spacing 335 may be employed to achieve these aspects. Then the conveyer transports the midsole to the next baths 343 and 344 and then to the blower system 310. The midsole 324, upon being further dried and stabilized by the heated air 330, may be unloaded from the handle 345 of the conveyor 320 for storage or further processing. As can be seen, the loading and unloading zones are in relative proximity with each other.

Persons familiar with the field of the invention will realize that the apparatus 300 may be practiced by various devices which are different from the specific illustrated embodiment. Therefore it is emphasized that the invention is not limited only to its embodiment but is embracing of a wide variety of mechanisms that stabilize heated phylon with one or more baths and, optionally, a blower system.

Referring now to FIG. 1, the stabilized midsoles 160 are passed to a post-stabilization station 160 where various operations are performed on the midsoles 160 to prepare them for storage and assembly to the balance of an article of footwear. In embodiments, the various operations include at least one or more of the following: ultra-violet (UV) curing, secondary cleaning, and priming. Next, the midsoles are passed to the marketplace 165 for eventual distribution to other stations at other modules. In an exemplary embodiment, the finished midsoles are removed from the marketplace II 165 for continued processing at an assembly module of the modularized manufacturing environment 100 for integration with a corresponding article of footwear.

Figure 4:
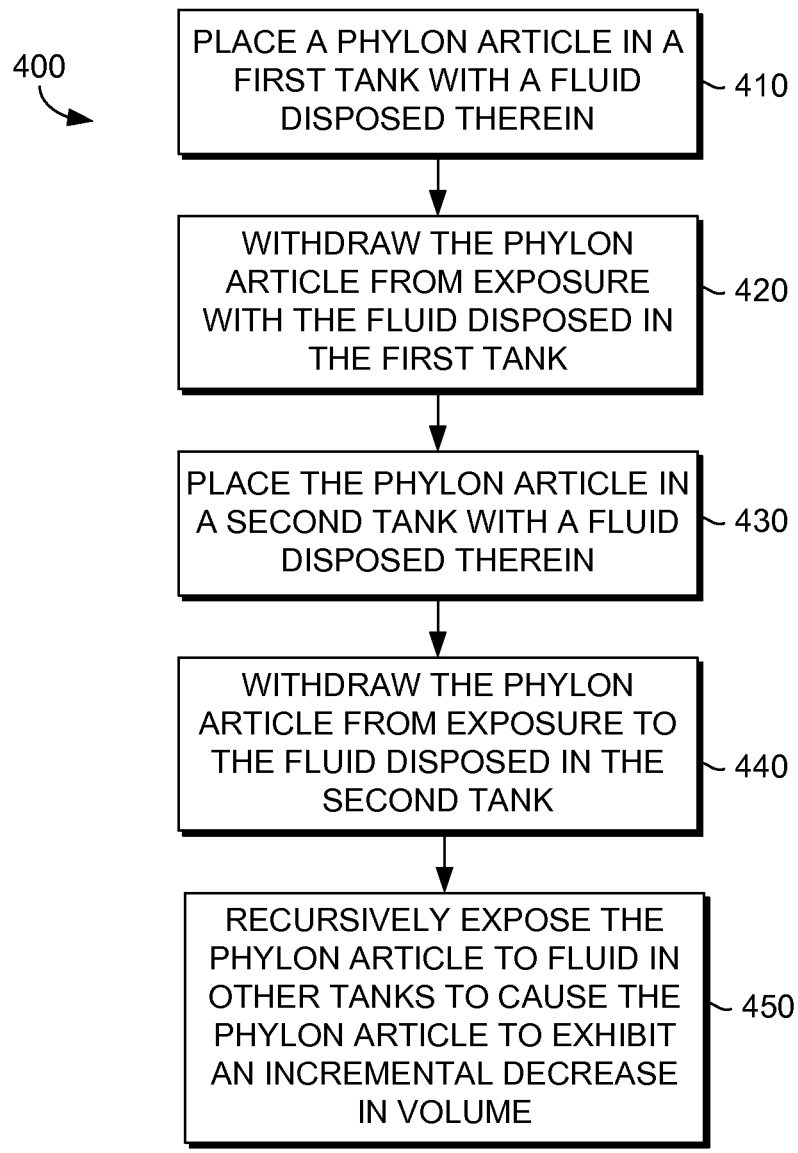
FIG. 4 illustrates a flow diagram showing an overall method for integrating a plurality of pre-formed biscuits, in accordance with embodiments of the present invention.

Turning to FIG. 4, a flow diagram is illustrated that shows an overall method 400 for stabilizing a heated phylon article, in accordance with embodiments of the present invention.

Initially, as depicted at block 410, a phylon article (comparable to the heated midsole 175 of FIGS. 1 and 9) is placed in a first tank with a fluid disposed therein. The fluid is held at substantially a first temperature and, typically, is water-based. As depicted at block 420, the phylon article is withdrawn from exposure, or submersion, with the fluid of the first tank. As depicted at blocks 430 and 440, the phylon article is placed in a second tank with fluid disposed therein, and with drawn from exposure with that fluid. This fluid of the second tank is held at substantially a second temperature that is cooler than the first temperature of the fluid in the first tank. In an exemplary embodiment, the difference between the temperatures ranges between five and ten degrees Celsius. As indicated at block 450, the phylon article is subsequently exposed to other tanks containing fluids at incrementally cooler temperatures. Upon being withdrawn from exposure with the fluid of the final tank, the phylon article is stabilized at a target size, and has dimensions that allow for assembly with a corresponding piece of footwear.

Figure 5:
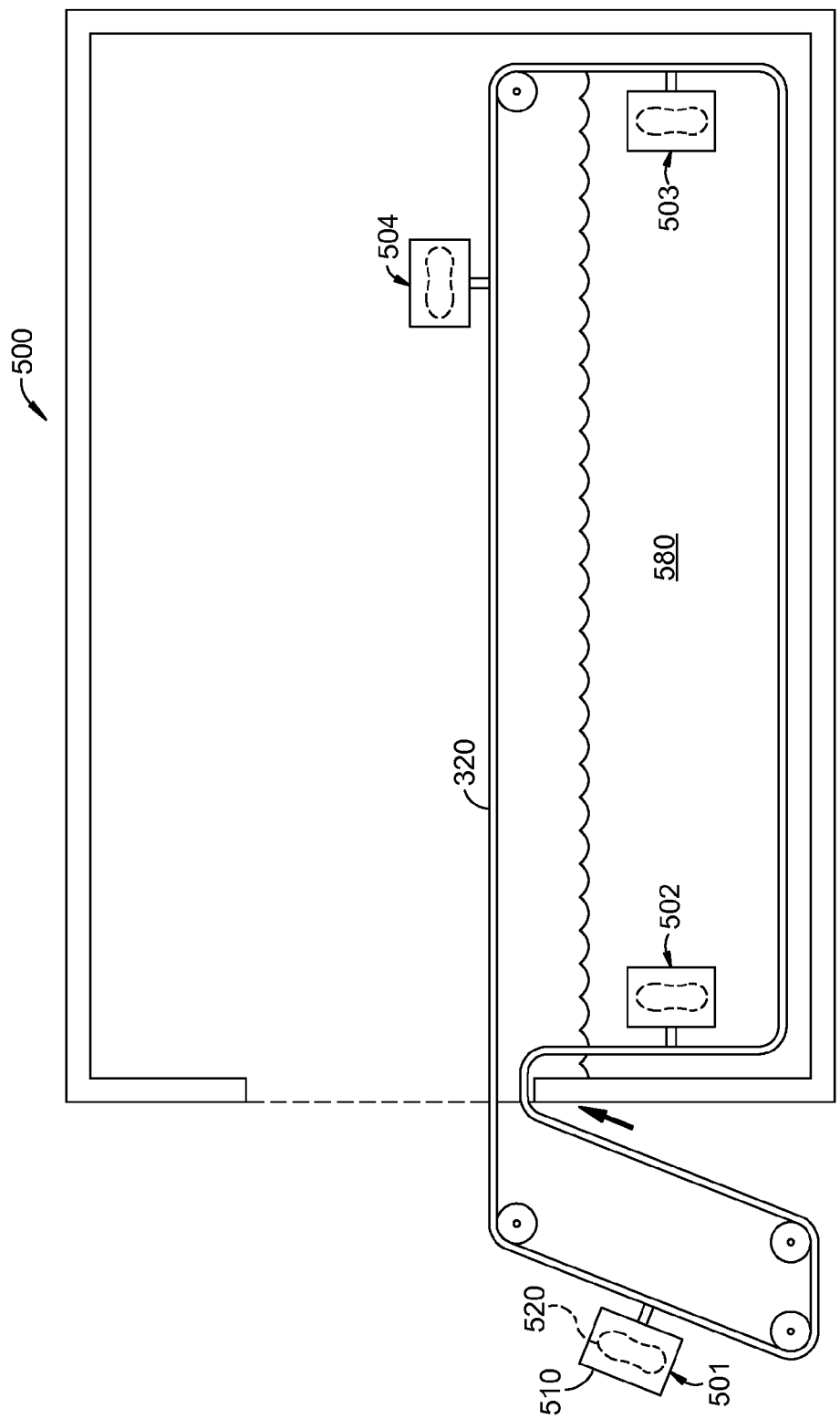
FIG. 5 illustrates a diagrammatic view of an exemplary apparatus for stabilizing a phylon article, in accordance with embodiments of the present invention.

With reference to FIG. 5, a diagrammatic view that illustrates an exemplary apparatus 500 within the stabilization station 155 is shown. Initially, the apparatus 500 includes a single bath 580 with a heat exchanger (not shown) disposed therewith. As discussed above, the heat exchanger may be set at varying temperatures and may comprise any type of heat exchanger known in the relevant field. Further, a conveyor 320 is provided to automatically immerse a phylon article 520 into the bath 580 and carry the phylon article 520 to a loading/unloading station 501 at and exit of the apparatus 500. Carrying the phylon article 520 is facilitated by a basket-type container 510 that is easily loaded and unloaded, yet allows for the fluid within the bath 580 to completely surround the surface of the phylon article(s) 520 accommodated therein. Although four containers 510 are shown, many more may be coupled to the conveyor 320.

In operation of the present system, the phylon article 520 (illustrated as a midsole) is loaded on the conveyor 320 on one of the containers 510 and is carried to, and immersed within, the fluid of the bath 580 at stage 502. The fluid may be heated by the heat exchanger, which is located in proximity with or submerged within the fluid. Next, the phylon article 520 drawn through the fluid for a predetermined amount of time until it reaches stage 503, where the phylon article 520 is withdrawn from the fluid. The phylon article 520 is then carried to the loading/unloading station 510, while being further dried and convention-stabilized by air. At this point, the phylon article may be unloaded from the conveyor 320 for bagging, storage, or further processing.

Figure 6:
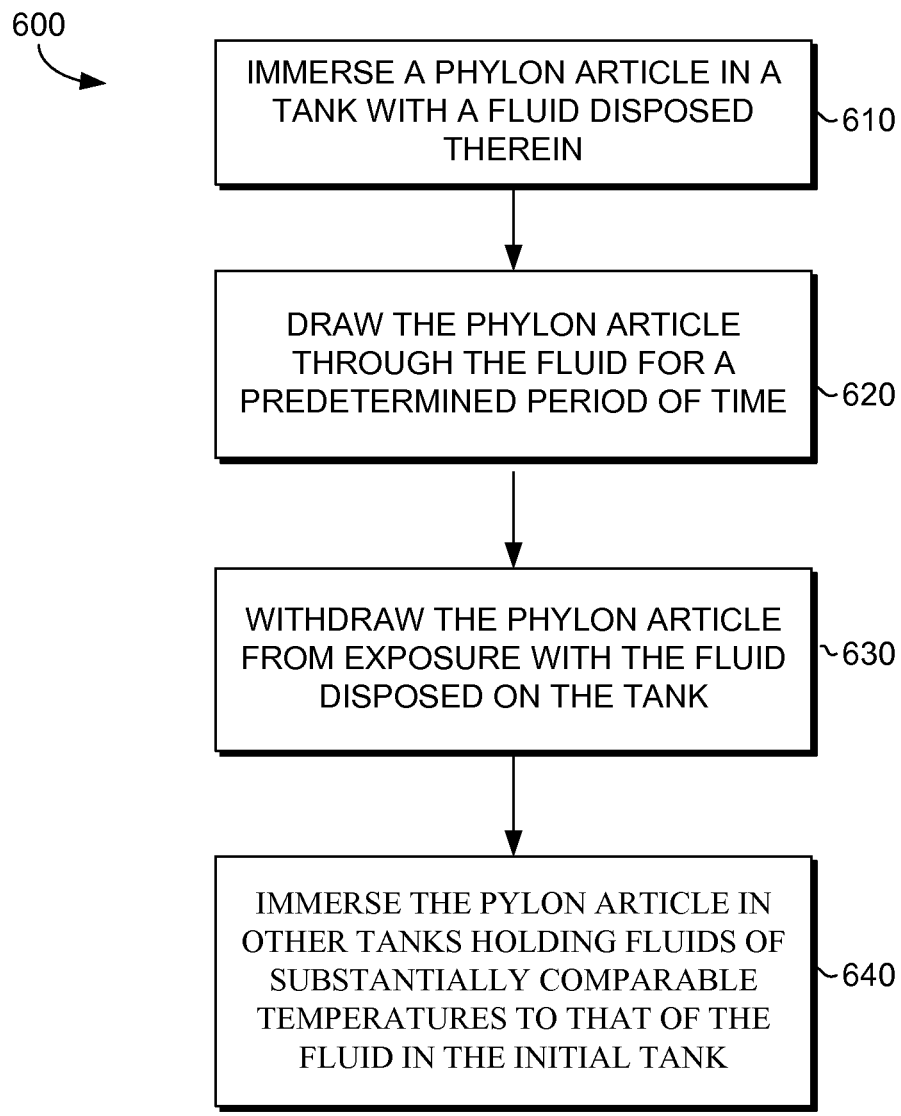
FIG. 6 illustrates a flow diagram showing an overall method for integrating a plurality of pre-formed biscuits, in accordance with embodiments of the present invention.

Turning to FIG. 6, a flow diagram is illustrated that shows an overall method 600 for stabilizing a heated phylon article, in accordance with embodiments of the present invention. Initially, as depicted at block 610, a phylon article is immersed in a tank with a fluid disposed therein. The fluid is held at substantially constant temperature and, typically, is water-based. As depicted at block 620, the phylon article is drawn through the fluid of the tank for a predetermined period of time. In embodiments, the period of time and the fluid temperature are established in accordance with a geometry, size, and composition of the phylon article. As depicted at block 630, the phylon article is withdrawn from exposure, or submersion, with the fluid of the tank. In an exemplary embodiment, the temperature of the fluid is held stable within a five-to-ten-degrees-Celsius range. As indicated at block 640, the phylon article is subsequently immersed in other tanks containing fluids of substantially comparable temperatures to that of the fluid in the initial tank. Upon being withdrawn from exposure with the fluid of a final tank of the other tanks, the phylon article is stabilized at a target size, and has dimensions that allow for assembly with a corresponding piece of footwear.

As discussed above, the phylon article is generally heated from a fabrication process, such as blowing the phylon article in a heat press. The immersion of the phylon article in a fluid (conduction cooling) promotes cooling of the phylon article at a much faster rate than exposure to air (convention cooling). Accordingly, the process of stabilizing the phylon article is expedited, thus, saving manufacturing time.

However, this faster rate of transferring heat away from the phylon article may cause a shape of the phylon article to deform. For instance, the phylon article may assume a first shape upon being released from the heat press, while assuming a second shape upon achieving stabilization. Accordingly, the first shape of the phylon article, which is controlled by the dimensions of a cavity in a mold, may be designed and fabricated to account for the inherent deformation. Also, other attributes of the phylon article, such as chemical composition, geometry, and size, may be adjusted to account for the deformation. Further, the temperature of the fluid and/or predetermined period of time in which the phylon article is exposed to the fluid in the tank(s) may be manipulated to account for the deformation. Thus, the second shape of the stabilized phylon article can be managed so that the second shape is acceptable for being assembled to corresponding components.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A manufacturing method for stabilizing a phylon article that is produced utilizing a heat process, the method comprising:

generating at least one pre-formed phylon biscuit from pelletized phylon in a first molding process, the at least one pre-formed phylon biscuit comprising an unexpanded phylon material;

preheating an interior of the at least one pre-formed phylon biscuit until a first threshold temperature is reached at a core of the at least one pre-formed phylon biscuit;

transferring the at least one preheated pre-formed phylon biscuit to a molding cavity of a mold, during a second molding process;

heating the mold containing the at least one preheated pre-formed phylon biscuit to a second threshold temperature, the heating to the second threshold temperature causing the unexpanded phylon material of the at least one pre-heated pre-formed phylon biscuit to expand, forming the phylon article;

removing the phylon article from the molding cavity of the heated mold after the phylon article is formed;

upon removal from the molding cavity, transferring the phylon article to a first fluid contained in a first tank via a conveyor coupled to a basket-type container to carry the phylon article, the first fluid being maintained at a first temperature;

withdrawing the phylon article from the first tank;

transferring the phylon article to a second fluid contained in a second tank, the second fluid being maintained at a second temperature that is less than the first temperature of the first fluid in the first tank; and withdrawing the phylon article from the second tank, such that the sequential placement of the heated phylon article into the first fluid of the first tank and the second fluid of the second tank thereby causes the temperature of the phylon article to controllably and gradually ramp down, as well as cause the phylon article to exhibit an incremental decrease in volume.

2. The method of claim 1, further comprising placing the phylon article in a third fluid contained in a third tank, wherein the second temperature of the second fluid of the second tank is higher than the temperature at which the third fluid of the third tank resides.

3. The method of claim 2, further comprising placing the phylon article in a fourth fluid contained in a fourth tank, wherein the third temperature of the third fluid of the third tank is higher than the temperature at which the fourth fluid of the fourth tank resides.

4. The method of claim 1, wherein the temperature of the first fluid of the first tank is ten degrees Celsius greater than the second temperature of the second fluid of the second tank.

5. The method of claim 1, wherein the first fluid of the first tank is predominantly water.

6. The method of claim 1, wherein the first tank is coupled to an apparatus that is configured to generate ultrasonic waves in the first fluid contained in the first tank.

7. The method of claim 1, wherein the phylon article is a midsole for an article of footwear.

8. The method of claim 3, wherein one of the first fluid in the first tank, the second fluid in the second tank, the third fluid in the third tank, and the fourth fluid in the fourth tank includes a cleaning solution.

9. The method of claim 3, wherein one of the first fluid in the first tank, the second fluid in the second tank, the third fluid in the third tank, and the fourth fluid in the fourth tank includes a primer additive to prepare the phylon article for accepting an adhesive.

10. The method of claim 9, wherein the primer additive includes a UV-activated chloride salt.

11. A manufacturing method for stabilizing a foamed phylon article that is produced utilizing a heat process, the method comprising:

generating at least one pre-formed phylon biscuit from pelletized phylon in a first molding process, the at least one pre-formed phylon biscuit comprising an unexpanded phylon material;

preheating an interior of the at least one pre-formed phylon biscuit until a threshold temperature is reached at a core of the at least one pre-formed phylon biscuit;

transferring the at least one pre-heated pre-formed phylon biscuit to a molding cavity of a mold, during a second molding process;

heating the mold containing the at least one pre-heated pre-formed phylon biscuit above the threshold temperature, the heating above the threshold temperature causing the unexpanded phylon material of the at least one pre-heated pre-formed phylon biscuit to expand, forming the foamed phylon article;

removing the foamed phylon article from the molding cavity of the mold;

stabilizing the foamed phylon article upon removal of the foamed phylon article from the mold by immersing the foamed phylon article in a first fluid contained in a first tank, wherein the first fluid is maintained at a first temperature that is less than a temperature of the heat process;

drawing the foamed phylon article through the first fluid of the first tank for a predetermined period of time;

withdrawing the foamed phylon article from exposure with the first fluid disposed in the first tank; and transferring the foamed phylon article to a drying station.

12. The method of claim 11, further comprising: prior to transferring the foamed phylon article to the drying station, immersing the foamed phylon article in a second fluid contained in a second tank, wherein the second fluid of the second tank is held at a second temperature substantially comparable to the first temperature of the first fluid of the first tank; and withdrawing the foamed phylon article from exposure with the second fluid disposed in the second tank.

13. The method of claim 11, further comprising adjusting the predetermined period of time based on a geometry of the foamed phylon article.

14. The method of claim 11, wherein the foamed phylon article is a midsole for an article of footwear, the method further comprising adjusting the predetermined period of time based on a size of the article of footwear.

15. The method of claim 11, further comprising adjusting the predetermined period of time based on a chemical composition of phylon forming the foamed phylon article.

16. The method of claim 11, wherein drawing the foamed phylon article through the first fluid of the first tank comprises utilizing a conveyor to automatically carry the foamed phylon article through the first fluid.

17. The method of claim 16, wherein a basket-type container coupled to the conveyor is employed to carry the foamed phylon article.

18. The method of claim 17, wherein the basket-type container is configured to allow the first fluid of the first tank to reach an entirety of a surface of the foamed phylon article.

19. The method of claim 11, further comprising:

removing the foamed phylon article from the drying station and placing the foamed phylon article in a sealable container to preserve a cleanliness of the foamed phylon article imparted by the first fluid.

20. A manufacturing method for stabilizing a phylon article that is produced by foaming a quantity of an unexpanded phylon material utilizing a heat process, the method comprising:

generating at least one pre-formed phylon biscuit from pelletized phylon in a first molding process, the at least one pre-formed phylon biscuit comprising an unexpanded phylon material;

preheating an interior of the at least one pre-formed phylon biscuit until a threshold temperature is reached at a core of the at least one pre-formed phylon biscuit;

transferring the at least one pre-heated pre-formed phylon biscuit to a molding cavity of a mold, during a second molding process;

heating the mold containing the at least one pre-heated pre-formed phylon biscuit above the threshold temperature, the heating above the threshold temperature causing the unexpanded phylon material of the at least one pre-heated pre-formed phylon biscuit to expand, forming the phylon article;

removing the phylon article from the molding cavity of the mold;

subsequent to removing the phylon article from the molding cavity of the mold, immersing the phylon article in at least a first fluid contained in a first tank, wherein the first fluid is maintained at a first temperature that is less than the threshold temperature;

drawing the phylon article through the at least first fluid of the first tank for a predetermined period of time;

withdrawing the phylon article from exposure with the at least first fluid disposed in the first tank;

utilizing a conveyor, automatically carrying the phylon article through the at least first fluid to a second fluid in a second tank, wherein the second fluid in the second tank is held at a second temperature that is less than the first temperature of the first fluid in the first tank, wherein the conveyor is coupled to a basket-type container to carry the phylon article, and wherein the basket-type container is configured to allow the first fluid of the first tank and the second fluid of the second tank to reach an entirety of a surface of the phylon article;

drying the phylon article; and placing the phylon article in a sealable container to preserve a cleanliness of the phylon article imparted by the first fluid and the second fluid.

\* \* \* \* \*